(12) United States Patent
Wang et al.

(10) Patent No.: US 12,177,151 B2
(45) Date of Patent: Dec. 24, 2024

(54) DOWNLINK PHASE-TRACKING REFERENCE SIGNAL RESOURCE MAPPING

(71) Applicant: Apple Inc., Cupertino, CA (US)

(72) Inventors: Guotong Wang, Beijing (CN); Alexei Davydov, Nizhny Novgorod (RU); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 420 days.

(21) Appl. No.: 17/286,341

(22) PCT Filed: Oct. 16, 2019

(86) PCT No.: PCT/US2019/056589
§ 371 (c)(1),
(2) Date: Apr. 16, 2021

(87) PCT Pub. No.: WO2020/081721
PCT Pub. Date: Apr. 23, 2020

(65) Prior Publication Data
US 2021/0359816 A1    Nov. 18, 2021

(30) Foreign Application Priority Data
Oct. 17, 2018   (WO) ................ PCT/CN2018/110651

(51) Int. Cl.
*H04W 72/23*    (2023.01)
*H04L 1/00*    (2006.01)
*H04L 5/00*    (2006.01)
*H04W 72/0446*    (2023.01)
*H04W 72/0453*    (2023.01)

(52) U.S. Cl.
CPC .......... *H04L 5/0051* (2013.01); *H04L 1/0067* (2013.01); *H04L 5/006* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 9,379,873 | B2 | 6/2016 | Kang et al. |
| 9,838,189 | B2 | 12/2017 | Zheng et al. |
| 10,085,251 | B2 | 9/2018 | Seo et al. |
| 10,103,797 | B2 | 10/2018 | Davydov et al. |

(Continued)

FOREIGN PATENT DOCUMENTS

| | | |
|---|---|---|
| CN | 104054280 A | 9/2014 |
| CN | 104219724 A | 12/2014 |

(Continued)

OTHER PUBLICATIONS

International Search Report and Written Opinion of the International Searching Authority directed to related International Patent Application No. PCT/US2019/056589, mailed Feb. 6, 2020; 7 pages.

(Continued)

*Primary Examiner* — Kodzovi Acolatse
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for mapping a phase-tracking reference signal to resource elements. Other embodiments may be described and claimed.

20 Claims, 7 Drawing Sheets

(56) References Cited

U.S. PATENT DOCUMENTS

| | | | |
|---|---|---|---|
| 10,420,083 | B2 | 9/2019 | Bendlin et al. |
| 10,560,243 | B2 | 2/2020 | Bai et al. |
| 2013/0242778 | A1 | 9/2013 | Geirhofer et al. |
| 2013/0288730 | A1 | 10/2013 | Gomadam et al. |
| 2016/0009437 | A1 | 1/2016 | Dane et al. |
| 2016/0080058 | A1 | 3/2016 | Kang et al. |
| 2016/0094374 | A1 | 3/2016 | Koorapaty et al. |
| 2017/0273061 | A1 | 9/2017 | Park et al. |
| 2019/0140729 | A1* | 5/2019 | Zhang .................... H04W 52/16 |
| 2019/0141693 | A1* | 5/2019 | Guo ...................... H04W 16/14 |
| 2019/0166615 | A1* | 5/2019 | Nimbalker ............ H04W 72/21 |
| 2019/0273544 | A1* | 9/2019 | Cha ....................... H04L 1/0026 |
| 2019/0296877 | A1* | 9/2019 | Zhang ................... H04L 5/0048 |
| 2019/0319692 | A1* | 10/2019 | Noh ...................... H04L 5/0048 |
| 2019/0363831 | A1* | 11/2019 | Davydov .............. H04L 5/0053 |
| 2020/0028718 | A1 | 1/2020 | Wang et al. |
| 2020/0045709 | A1* | 2/2020 | Seo ....................... H04W 72/53 |
| 2020/0177416 | A1* | 6/2020 | Jiang .................... H04L 5/0048 |
| 2020/0389270 | A1* | 12/2020 | Lee ....................... H04W 72/20 |
| 2023/0308228 | A1* | 9/2023 | Alfarhan .............. H04L 1/1887 370/329 |

FOREIGN PATENT DOCUMENTS

| | | | |
|---|---|---|---|
| CN | 104982063 | A | 10/2015 |
| CN | 105122869 | A | 12/2015 |
| CN | 107852321 | A | 3/2018 |
| CN | 108631975 | A | 10/2018 |
| CN | 110192373 | A | 8/2019 |
| GB | 2575140 | A | 1/2020 |
| WO | WO-2018044715 | A1 | 3/2018 |
| WO | 2018165911 | A1 | 9/2018 |

OTHER PUBLICATIONS

Spreadtrum Communications, "On RS multiplexing," R1-1713051, 3GPP TSG RAN WG1 Meeting #90, Prague, Czech Rep., Aug. 11, 2017.

Spreadtrum Communications, "On DL RS multiplexing," R1-1715511, 3GPP TSG RAN WG1 Meeting NR#3, Nagoya, Japan, Sep. 11, 2017.

3GPP TS 38.211 V15.3.0, "3GPP; TSG RAN; NR; Physical channels and modulation (Release 15)," Sep. 27, 2018.

3GPP TS 38.214 V15.3.0, "3GPP; TSG RAN; NR; Physical layer procedures for data (Release 15)," Oct. 1, 2018.

CMCC, "Phase-Tracking Reference Signal Design for High-Frequency Systems," 3GPP TSG RAN WG1 NR Ad-Hoc Meeting, Spokane, USA, Jan. 16-20, 2017, R1-1700438; 11 pages.

Examination Report, dated Feb. 22, 2022, for Indian Patent Appl. No. 202117021894, 7 pages.

* cited by examiner

DOWNLINK PHASE-TRACKING REFERENCE SIGNAL RESOURCE MAPPING

CROSS REFERENCE TO RELATED APPLICATION

The present application is a U.S. National Phase of International Application No. PCT/US2019/056589 entitled "Downlink Phase-Tracking Reference Signa Resource Mapping", filed Oct. 17, 2019 and claims priority to PCT/CN2018/110651, filed Oct. 17, 2018, entitled "Downlink PT-RS Resource Mapping," the entire disclosures of which is hereby incorporated by reference in their entireties.

FIELD

Embodiments of the present invention relate generally to the technical field of wireless communications.

BACKGROUND

Wireless networks based on Third Generation Partnership Project (3GPP) Technical Specifications provide for transmission of a number of reference signals. These reference signals may be transmitted in the uplink or in the downlink. Some of these reference signals include demodulation reference signals (DMRSs), phase-tracking reference signals (PT-RSs), sounding reference signals (SRSs), channel state information-reference signals (CSI-RSs), cell-specific reference signals (CRSs), physical synchronization signals (PSSs), and secondary synchronization signals (SSSs).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. Other embodiments may be utilized and structural or logical changes may be made without departing from the scope of the present disclosure. Therefore, the following detailed description is not to be taken in a limiting sense.

The description may describe various operations as multiple discrete actions or operations in turn, in a manner that is most helpful in understanding the claimed subject matter. However, the order of description does not imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

Figure 1:
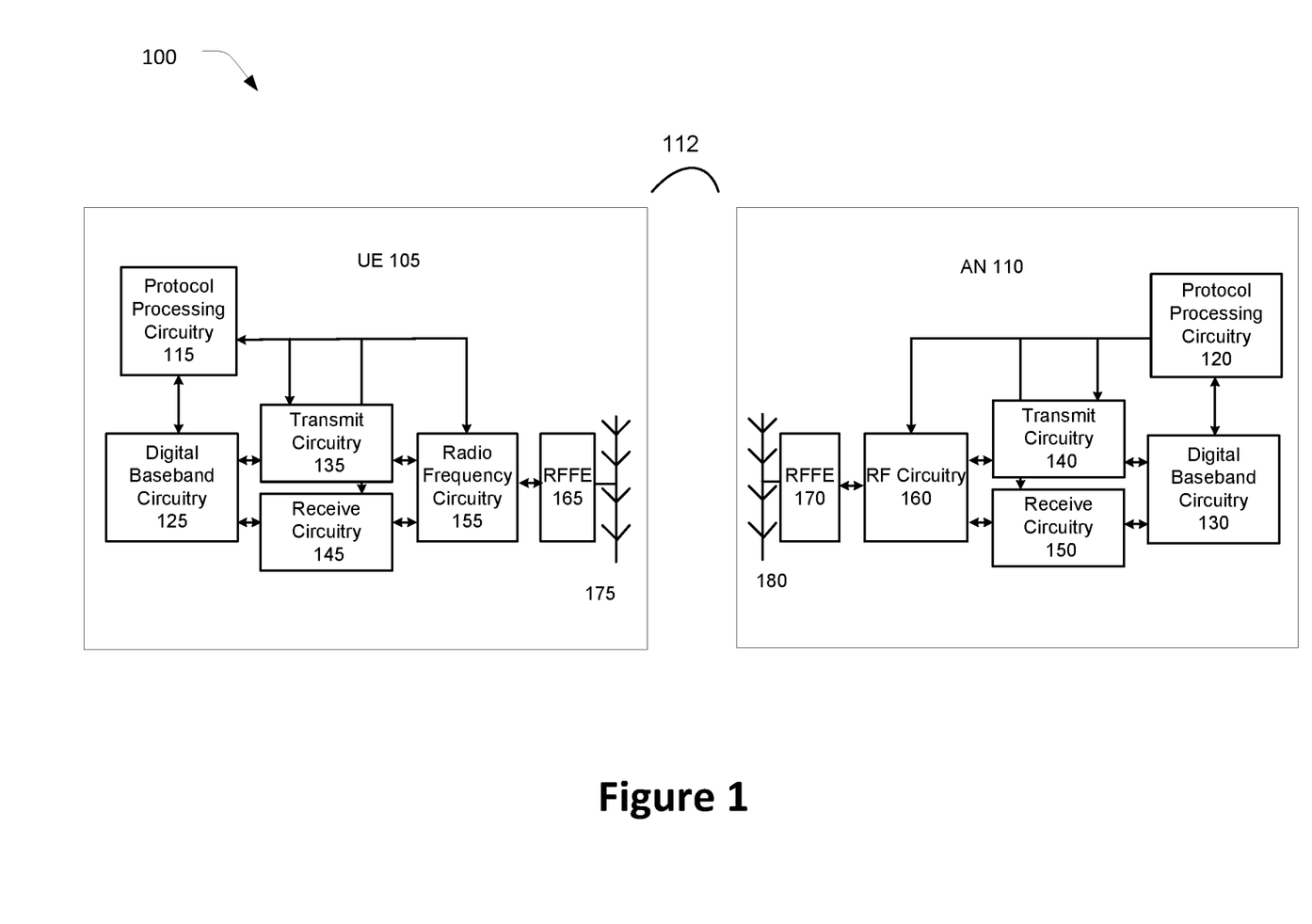
FIG. 1 schematically illustrates an example of network in accordance with various embodiments.

FIG. 1 schematically illustrates an example wireless network 100 (hereinafter "network 100") in accordance with various embodiments herein. The network 100 may include a (UE) 105 in wireless communication with an access node (AN) 110. In some embodiments, the network 100 may be a network compatible with 3GPP New Radio (NR) or long Term Evolution (LTE) Technical Specifications (TSs). The UE 105 may be configured to connect, for example, to be communicatively coupled, with the AN 110 via connection 112. In this example, the connection 112 is illustrated as an air interface to enable communicative coupling, and can be consistent with cellular communications protocols such as an LTE protocol, a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The operations performed by the protocol processing circuitry 115 may be referred to as higher-layer signaling operations, as they occur higher than a physical (PHY) layer of the communication protocol. The protocol processing circuitry 115 may include one or more processing cores (not shown) to execute instructions and one or more memory structures (not shown) to store program and data information.

The UE 105 may further include digital baseband circuitry 125, which may implement the PHY functions including one or more of hybrid automatic repeat request-acknowledgment (HARQ-ACK) functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions. The PHY functions may be referred to as lower-layer functions.

The UE 105 may further include transmit circuitry 135, receive circuitry 145, radio frequency (RF) circuitry 155, and RF front end (RFFE) 165, which may include or connect to one or more antenna panels 175.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175.

The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The transmission components of the UE 105 may apply a spatial filter to the data to be transmitted to form a transmit beam emitted by the antenna elements of the one or more antenna panels 180.

The AN 110 may provide configuration information via one or more configuration signals in the downlink. The configuration signals may be a combination of higher- and lower-layer signals that occur at different frequencies or events. Among other things, the configuration information may configure the various reference signals to be received or transmitted by the UE 105.

A PT-RS may be used for phase tracking a data channel. The PT-RS may allow tracking of a phase of a local oscillator at transmitter and receiver. The PT-RS may be present in the downlink data channel, for example, the physical downlink shared channel (PDSCH), or the uplink data channel, for example, physical uplink shared channel (PUSCH). The PT-RS may be used by receiver to suppress phase noise and common phase error, which may be especially prevalent at millimeter-wave frequencies used in NR transmissions.

Figure 2:
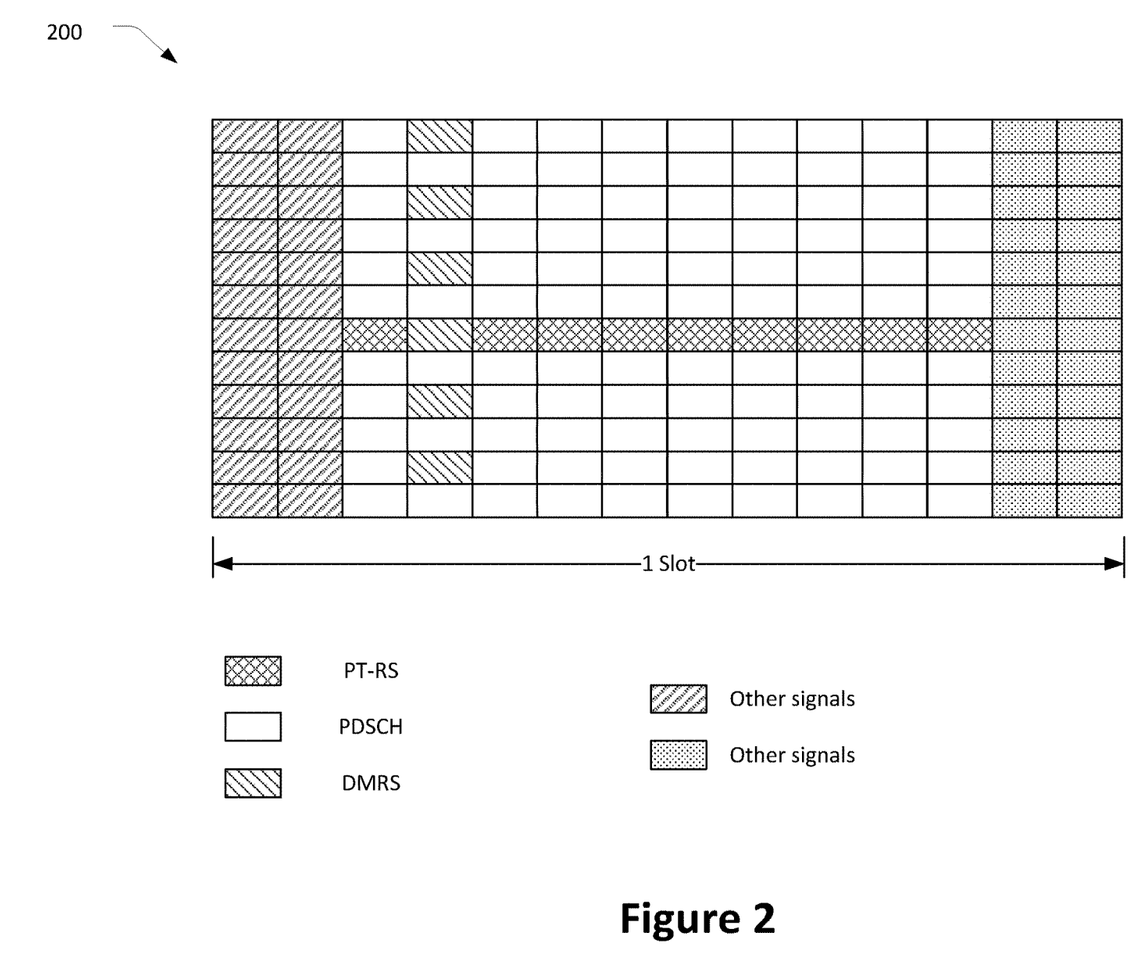
FIG. 2 illustrates a downlink resource grid in accordance with various embodiments.

FIG. 2 illustrates a downlink resource grid 200 in accordance with some embodiments. The downlink resource grid 200 may include 14 symbols in the time domain and 12 subcarriers in the frequency domain. A resource element, which may be the smallest element of the downlink resource grid 200, may be made up of one subcarrier in the frequency domain and one symbol in the time domain. The symbols may be orthogonal frequency division multiplexing (OFDM) symbols.

The resource elements of the downlink resource grid 200 may carry DMRS, PDSCH, PT-RS, and other signals as shown in accordance with one embodiment. The PT-RS may be transmitted on one subcarrier over a plurality of symbols. The PT-RS may be transmitted according to any of a number of other transmission patterns in other embodiments. In general, however, the PT-RS may have relatively greater density in the time domain as opposed to the frequency domain.

Scheduling, encoding, decoding and use of the PT-RS may be consistent with descriptions provided in 3GPP TS 38.211 v15.3.0 (2018-09) and TS 38.214 v15.3.0 (2018-09) except as otherwise described herein.

In some embodiments, one or more of the reference signals may be configured in resource elements, or sets of resource elements (for example, a resource block that includes, for example, 12 resource elements) in which a PT-RS is to be sent. For example, the configuration information provided to the UE 105 may configure a particular resource element with both a PT-RS and another reference signal. Various embodiments describe the mapping of the PT-RS in these and other circumstances.

It may be that certain categories of reference signals are to be associated with a relatively higher priority than other transmissions, or at least may take precedence with respect to a particular resource element. For example, an aperiodic CSI-RS may be triggered by another PDCCH, which carries an uplink grant. For PDSCH resource mapping, the resource elements used for CSI-RS except for aperiodic CSI-RS and CSI-RS for mobility may be considered as "not available" to the PDSCH. Thus, whether the resource element(s) for aperiodic CSI-RS should be considered as "not available" for PT-RS resource mapping could be one issue.

Further with regard to LTE and NR co-existence, resource elements used for CRS can be considered as "not available" for PDSCH resource mapping, which can be configured by higher-layer signaling lte-CRS-ToMatchAround. Then whether the resource elements for LTE CRS can be considered as "not available" for PT-RS resource mapping could be another issue.

In addition, PT-RS should not be mapped to the resource elements used for a detected PDCCH. However it is challenging for UE implementation to decide PT-RS resource mapping pattern after detecting all PDCCH. Therefore, how to decide the "detected PDCCH" for PT-RS resource mapping could be another issue. RRC signaling can indicate the CORESET ID to decide PDSCH resource mapping pattern, but there can be multiple CORESET 0 instances, one of which is tied to one Synchronization Signal Block (SSB) and is quasi-co-located (QCLed) with the SSB. Then how to handle PT-RS/PDSCH and CORESET 0 multiplexing could be another issue.

The present disclosure provides embodiments for downlink PT-RS resource mapping when PT-RS and aperiodic CSI-RS are multiplexed; PT-RS and LTE CRS are multiplexed; and PT-RS/PDSCH and CORESET 0 are multiplexed.

In some embodiments, a PT-RS shall not be multiplexed to the resource elements that are used for non-zero-power (NZP) CSI-RS except for non-zero-power CSI-RSs for mobility or aperiodic NZP CSI-RS resources. Since different PDCCH can be used to trigger aperiodic CSI-RS and PDSCH, and the triggering PDCCH can be transmitted in different slots, it is difficult for UE to decide the PT-RS resource mapping pattern after decoding all possible PDCCH.

Figure 3:
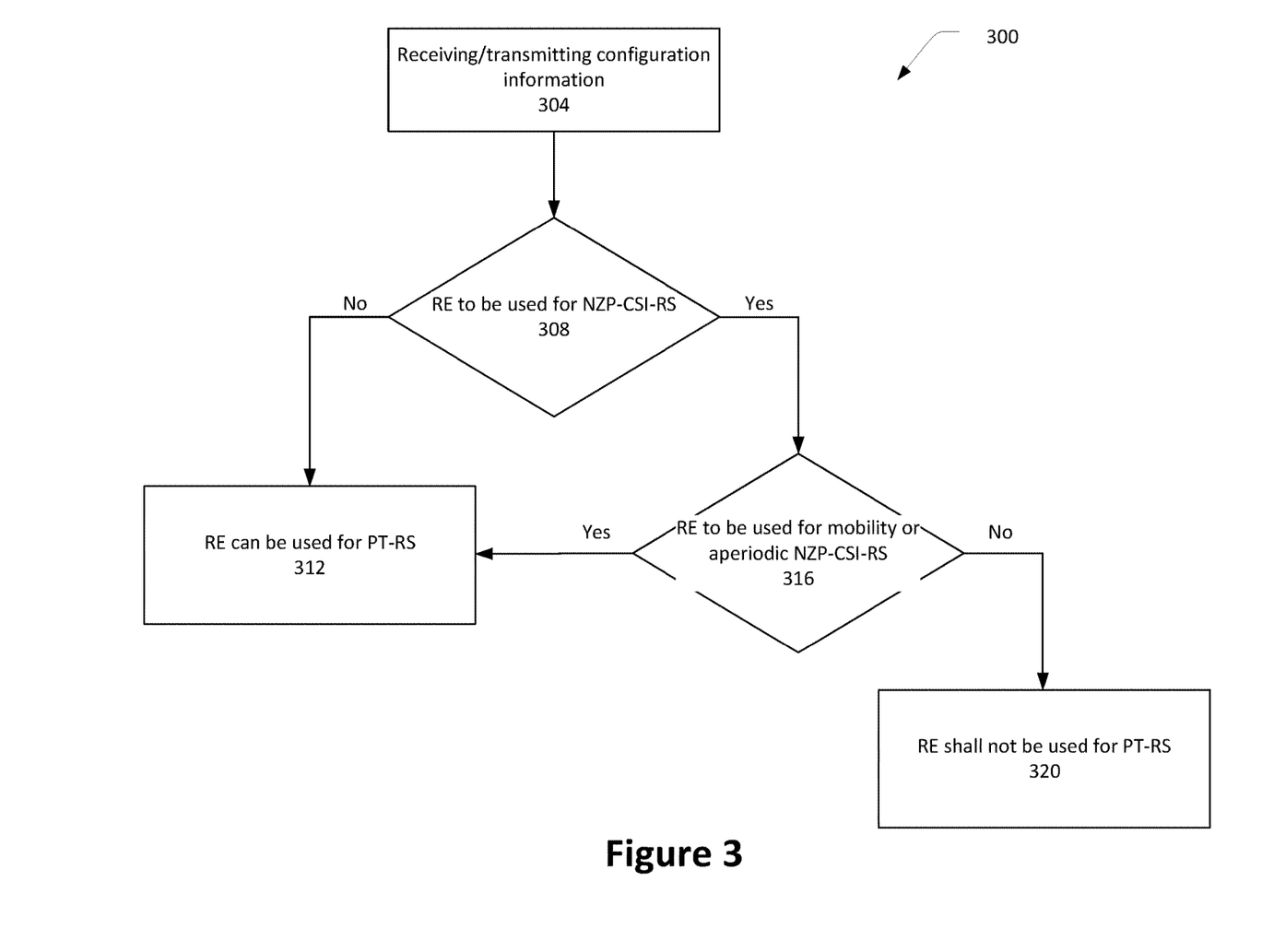
FIG. 3 illustrates an operation flow/algorithmic structure in accordance with various embodiments.

FIG. 3 illustrates an operation flow/algorithmic structure 300 that may be used for multiplexing PT-RS and NZP CSI-RS in accordance with some embodiments. The operation flow/algorithmic structure 300 may be performed by either the UE 105 or the AN 110 in various embodiments. In particular, the UE 105, or circuitry therein, may use the operation flow/algorithmic structure 300 to determine which resource elements can be used for a PT-RS or NZP CSI-RS so that a downlink channel may be decoded accordingly. Alternatively, the AN 110, or circuitry therein, may use the operation flow/algorithmic structure 300 to determine which resource elements can be used for the PT-RS or the NZP CSI-RS so that a downlink channel may be encoded accordingly.

The operation flow/algorithmic structure 300 may include, at 304, receiving/transmitting configuration information. In the event the operation flow/algorithmic structure 300 is performed by the access node 110, this operation may include transmitting configuration information. In the event the operation flow/algorithmic structure 300 is performed by the UE 105, this operation may include receiving the configuration information. In various embodiments, the configuration information may be communicated through one or more configuration signals, which may be any combination of higher- and lower-layer configuration signals.

The configuration information may configure various aspects of a downlink channel including, for example, which resource elements are to be used for PDSCH and reference signals including, but not limited to, PT-RS and CSI-RS. In some embodiments, one or more resource elements may include a conflicting configuration, for example, configured for both a PT-RS and a CSI-RS.

The operation flow/algorithmic structure 300 may include, at 308, determining whether a resource element is to be used for an NZP CSI-RS. The resource element may be one that includes the conflicting configuration. If a resource element is configured for a zero power CSI-RS or is configured for something other than a CSI-RS, then it may be determined that the resource element is not configured for NZP CSI-RS.

If it is determined, at 308, that the resource element is not to be used for NZP CSI-RS, the operation flow/algorithmic structure 300 may include, at 308, determining that the RE can be used for PT-RS. Thus, the resource element may be encoded or decoded accordingly.

If it is determined, 308, that the resource element is to be used for NZP CSI-RS, then the operation flow/algorithmic structure 300 may advance to determining whether the resource element to be used for mobility or aperiodic NZP CSI-RS.

In various embodiments, different types of CSI-RSs may be configured. These different types may be configured differently and associated with different priorities/precedence. For example, in some embodiments RRC signaling may be used to provide configuration information (for example, period information, offset information, etc.) that configure a periodic CSI-RS. This may be done relatively infrequently and the UE 105 may have the information well in advance of a particular downlink. For another example, in some embodiments, a PDCCH may be used to convey configuration information that configures mobility or aperiodic NZP CSI-RS. Thus, this configuration may be more dynamic in nature, with less advance notice than the RRC configured NZP CSI-RS. Therefore, the operation flow/algorithmic structure 300 may include, at 316, determining whether the RE is to be used for the mobility or aperiodic NZP CSI-RS (for example, the PDCCH-configured NZP CSI-RS).

If it is determined, at 316, that the RE is to be used for mobility/aperiodic NZP CSI-RS, then the operation flow/algorithmic structure 300 may advance to 312 and it may be determined that the RE can be used for PT-RS and the resource element may be encoded or decoded accordingly.

If, however, it is determined, at 316, that the RE is not to be used for mobility/aperiodic NZP CSI-RS, then the operation flow/algorithmic structure 300 may advance to 320 and it may be determined that the RE cannot be used for PT-RS. For example, if the RE is determined to be configured for periodic NZP CSI-RS, then the RE cannot be used for the PT-RS and may be used for the periodic NZP CSI-RS by encoding or decoding accordingly.

In some embodiments, PT-RS may not be multiplexed to the resource elements that are used for some LTE CRS, where an LTE CRS position can be indicated by higher layer signaling (for example, a match around parameter such as lte-CRS-ToMatchAround). Thus, the interference from NR to LTE can be reduced.

Figure 4:
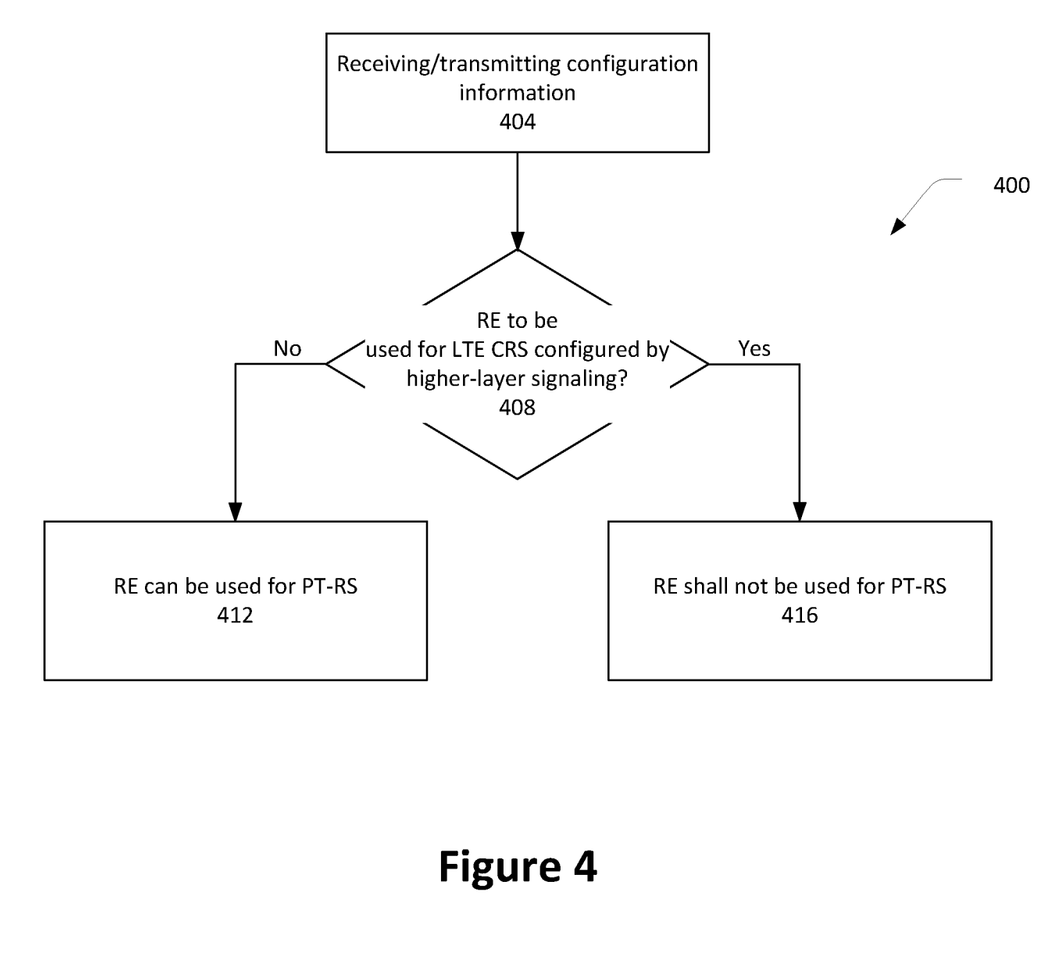
FIG. 4 illustrates an operation flow/algorithmic structure in accordance with various embodiments.

FIG. 4 illustrates an operation flow/algorithmic structure 400 that may be used for multiplexing PT-RS and LTE CRS in accordance with some embodiments. The operation flow/algorithmic structure 400 may be performed by either the UE 105 or the AN 110 in various embodiments. In particular, the UE 105, or circuitry therein, may use the operation flow/algorithmic structure 400 to determine which resource elements can be used for a PT-RS or LTE CRS so that a downlink channel may be decoded accordingly. Alternatively, the AN 110, or circuitry therein, may use the operation flow/algorithmic structure 400 to determine which resource elements can be used for the PT-RS or the LTE CRS so that a downlink channel may be encoded accordingly.

The operation flow/algorithmic structure 400 may include, at 404, receiving/transmitting configuration information. In the event the operation flow/algorithmic structure 400 is performed by the access node 110, this operation may include transmitting configuration information. In the event the operation flow/algorithmic structure 400 is performed by the UE 105, this operation may include receiving the configuration information. In various embodiments, the configuration information may be communicated through one or more configuration signals, which may be any combination of higher- and lower-layer configuration signals.

The configuration information may configure various aspects of a downlink channel including, for example, which resource elements are to be used for PDSCH and reference signals including, but not limited to, PT-RS and LTE CRS. In some embodiments, one or more resource elements may include a conflicting configuration, for example, configured for both a PT-RS and an LTE CRS.

The operation flow/algorithmic structure 400 may include, at 408, determining whether a resource element is to be used for LTE CRS configured by higher-layer signaling. Thus, if the resource element is not configured for LTE CRS or is configured for LTE CRS by lower-layer signaling (for example, PHY layer signaling), the determination at 408 may be in the negative.

If it is determined, at 408, that the resource element is not to be used for LTE CRS configured by higher-layer signaling, the operation flow/algorithmic structure 400 may include, at 408, determining that the resource element can be used for PT-RS. The resource element may be encoded/decoded with/for the PT-RS accordingly.

If it is determined, 408, that the resource element is to be used for LTE CRS configured by higher-layer signaling, the operation flow/algorithmic structure 400 may include, at 416, determining that the resource element is not be used for PT-RS. The resource element may be encoded/decoded with/for the LTE CRS accordingly.

In some embodiments, a PDCCH may be encoded on resource elements of a PDSCH and may schedule other resource elements of the PDSCH in which it is encoded. In some embodiments, it may be determined that a PT-RS is not to be multiplexed on resource elements used for the PDCCH that schedules a current PDSCH. In another option, PT-RS should not be multiplexed to the resource blocks used for PDCCH that schedules current PDSCH. So, for example, if a PDCCH is encoded on some resource elements of a resource block, and if the PDCCH schedules resource elements of the PDSCH in which it is encoded, then none of the resource elements of the resource block shall be used for PT-RS. This may be case even if not all of the resource elements of the resource block are actually used for the PDCCH.

For the other PDCCH, as it is hard for the UE 105 to decode all the PDCCH before determining PT-RS resource mapping pattern, the UE 105 can decide the PT-RS resource mapping pattern in resource block level, which is configured by corresponding parameters for the Control Resource Set (CORESET) and Search Space (SS) in RRC signaling.

A CORESET may be made up of multiple resource blocks in the frequency domain and one or more (for example, one, two, or three) OFDM symbols in the time domain. In some embodiments, a bandwidth part may be configured with more than one CORESET per bandwidth part. A CORESET having a resource set ID of 0, for example, CORESET 0, may be a common CORESET that is configured in a master information block (MIB) and in a serving cell configuration common (ServingCellConfigCommon) parameter. CORESETs having values of 1 or greater may identify CORESETs configured by dedicated signaling. Various embodiments describe the multiplexing of PT_RS and CORESET 0.

Figure 5:
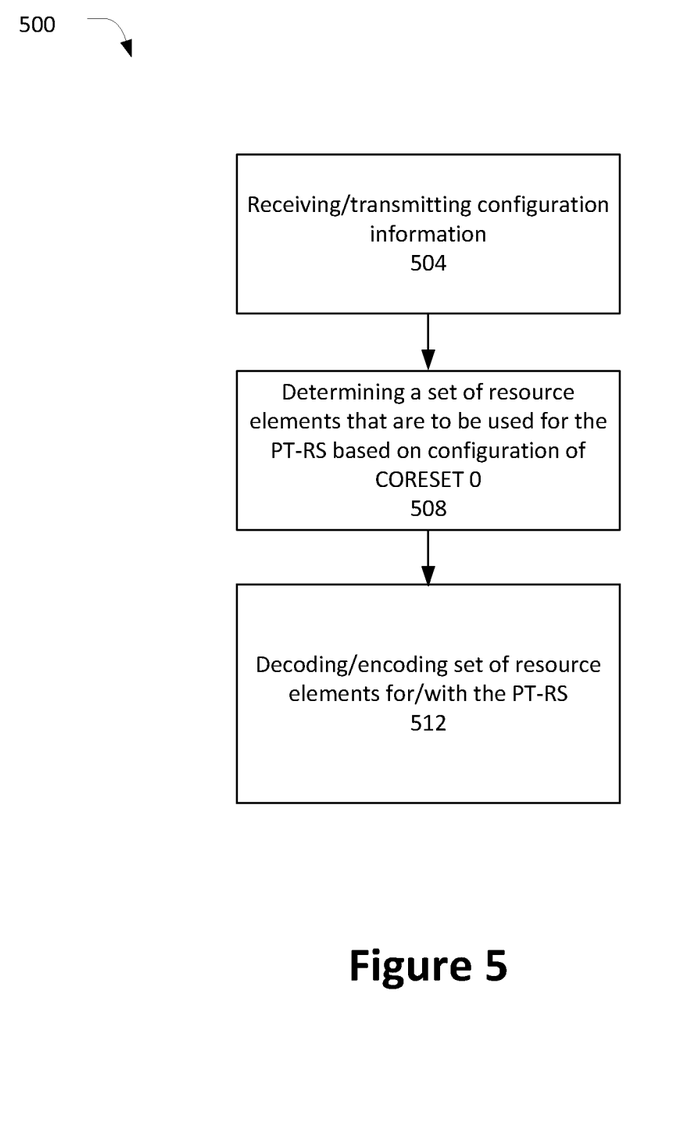
FIG. 5 illustrates an operation flow/algorithmic structure in accordance with various embodiments.

FIG. 5 illustrates an operation flow/algorithmic structure 400 that may be used for multiplexing PT-RS and CORESET 0 in accordance with some embodiments. The operation flow/algorithmic structure 500 may be performed by either the UE 105 or the AN 110 in various embodiments. In particular, the UE 105, or circuitry therein, may use the operation flow/algorithmic structure 500 to determine which resource elements can be used for a PT-RS or CORESET so that a downlink channel may be decoded accordingly. Alternatively, the AN 110, or circuitry therein, may use the operation flow/algorithmic structure 500 to determine which resource elements can be used for the PT-RS or the CORESET 0 so that a downlink channel may be encoded accordingly.

The operation flow/algorithmic structure 500 may include, at 504, receiving/transmitting configuration information. In the event the operation flow/algorithmic structure 500 is performed by the access node 110, this operation may include transmitting configuration information. In the event the operation flow/algorithmic structure 500 is performed by the UE 105, this operation may include receiving the configuration information. In various embodiments, the configuration information may be communicated through one or more configuration signals, which may be any combination of higher- and lower-layer configuration signals.

The operation flow/algorithmic structure 500 may include, at 508, determining a set of resource elements that are to be used for the PT-RS. The following options may be used to determine the set of resource elements to be used for the PT-RS based on CORSET 0 configuration.

In a first option, the UE 105 shall expect that CORESET 0 should not be indicated in a rate match pattern parameter (for example, RateMatchPattern). Thus, rate matching for PDSCH/PT-RS does not need to take CORESET 0 into account.

In a second option, the PDSCH/PT-RS should not be mapped to the resource elements or resource blocks configured for CORESET 0, regardless whether it is indicated in RateMatchPattern or not.

In some embodiments, there may be more than one instance of a CORESET 0. In these embodiments, one instance of the CORESET 0 may be multiplexed with the PT-RS differently than other instances. Thus, in a third option, the PDSCH/PT-RS should not be mapped to the resource elements or resource blocks configured for a CORESET 0 if the CORESET 0 is indicated by RateMatch- Pattern, and the CORESET 0 is tied to an SSB having an index that is: identified during most recent random access; explicitly indicated by MAC Control Element (CE); or implicitly based on a Transmission Configuration Indication (TCI) state that includes a CSI-RS QCLed with the SSB.

In a fourth option, the PDSCH/PT-RS should not be mapped to the resource elements or resource blocks configured for CORESET 0 if the CORESET 0 is tied to the SSB having the index noted above regardless of whether the CORESET 0 is indicated by RateMatchPattern or not.

Using one or more of these options, the UE 105 and AN 110 may determine which sets of resource elements are available for PT-RS and, correspondingly, which are not.

The operation flow/algorithmic structure 500 may further include, at 512, decoding/encoding set of resource elements for/with the PT-RS.

Figure 6:
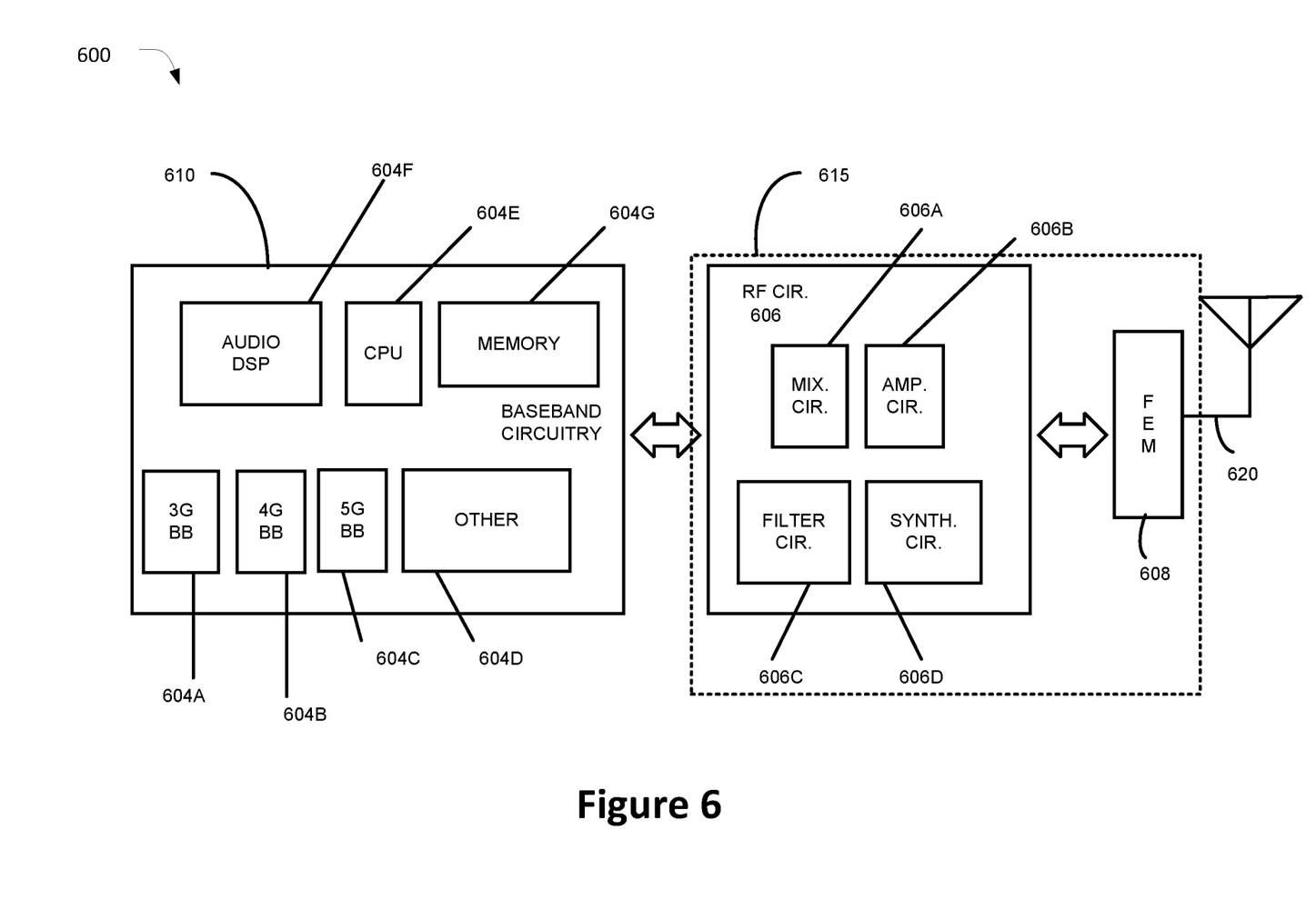
FIG. 6 illustrates an example device in accordance with various embodiments.

FIG. 6 illustrates a device 600 that includes baseband circuitry 610 and radio front end modules (RFEM) 615 in accordance with various embodiments. The device 600 may correspond to a UE (for example, UE 105) or to an access node (for example AN 110). As shown, the RFEMs 615 may include radio frequency (RF) circuitry 606, front-end module (FEM) circuitry 608, antenna array 611 coupled together at least as shown.

The baseband circuitry 610 includes circuitry and/or control logic configured to carry out various radio/network protocol and radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 610 may include Fast-Fourier Transform (FFT), precoding, or constellation mapping/demapping functionality. In some embodiments, encoding/decoding circuitry of the baseband circuitry 610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry for generation and processing of the baseband signals and for controlling operations of the RF circuitry 606. The baseband circuitry 610 may handle various radio control functions.

The aforementioned circuitry and/or control logic of the baseband circuitry 610 may include one or more single or multi-core processors. For example, the one or more processors may include a 3G baseband processor 604A, a 4G/LTE baseband processor 604B, a 5G/NR baseband processor 604C, or some other baseband processor(s) 604D for other existing generations, generations in development or to be developed in the future (e.g., sixth generation (6G), etc.). In other embodiments, some or all of the functionality of baseband processors 604A-D may be included in modules stored in the memory 604G and executed via a central processing unit (CPU) 604E. In other embodiments, some or all of the functionality of baseband processors 604A-D may be provided as hardware accelerators (e.g., FPGAs, ASICs, etc.) loaded with the appropriate bit streams or logic blocks stored in respective memory cells. In various embodiments, the memory 604G may store program code of a real-time OS (RTOS), which when executed by the CPU 604E (or other baseband processor), is to cause the CPU 604E (or other baseband processor) to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression/decompression and echo cancellation and may include other suitable processing elements in other embodiments.

In some embodiments, each of the processors 604A-604E include respective memory interfaces to send/receive data to/from the memory 604G. The baseband circuitry 610 may further include one or more interfaces to communicatively couple to other circuitries/devices, such as an interface to send/receive data to/from memory external to the baseband circuitry 610; an application circuitry interface to send/receive data to/from the application circuitry; an RF circuitry interface to send/receive data to/from RF circuitry 606 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from a power management integrated circuit.

In alternate embodiments (which may be combined with the above described embodiments), baseband circuitry 610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

Although not shown by FIG. 6, in some embodiments, the baseband circuitry 610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 610 and/or RF circuitry 606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 610 and/or RF circuitry 606 are part of a Wi-Fi communication system. In the second example, the protocol processing circuitry would operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In one example, the components of the baseband circuitry 610 may be suitably combined in a single chip or chipset, or disposed on a same circuit board. In another example, some or all of the constituent components of the baseband circuitry 610 and RF circuitry 606 may be implemented together such as, for example, a system on a chip (SoC) or System-in-Package (SiP). In another example, some or all of the constituent components of the baseband circuitry 610 may be implemented as a separate SoC that is communicatively coupled with and RF circuitry 606 (or multiple instances of RF circuitry 606). In yet another example, some or all of the constituent components of the baseband circuitry 610 and the application circuitry may be implemented together as individual SoCs mounted to a same circuit board (e.g., a "multi-chip package").

In some embodiments, the baseband circuitry 610 may provide for communication compatible with one or more radio technologies. For example, in some embodiments, the baseband circuitry 610 may support communication with an E-UTRAN or other WMAN, a WLAN, a WPAN. Embodiments in which the baseband circuitry 610 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path, which may include circuitry to down-convert RF signals received from the FEM circuitry 608 and provide baseband signals to the baseband circuitry 610. RF circuitry 606 may also include a transmit signal path, which may include circuitry to up-convert baseband signals provided by the baseband circuitry 610 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry XT106b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 610 or the application circuitry depending on the desired output frequency. In some embodiments, a divider control input (e.g., N) may be determined from a look-up table based on a channel indicated by the application circuitry.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from antenna array 611, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of antenna elements of antenna array 611. In various embodiments, the amplification through the transmit or receive signal paths may be done solely in the RF circuitry 606, solely in the FEM circuitry 608, or in both the RF circuitry 606 and the FEM circuitry 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry XT106), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 611 including one or more antenna elements (not shown). The antenna elements may be omnidirectional, direction, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed in as a patch of metal foil (e.g., a patch antenna) in a variety of shapes, and may be coupled with the RF circuitry 606 and/or FEM circuitry 608 using metal transmission lines or the like.

Figure 7:
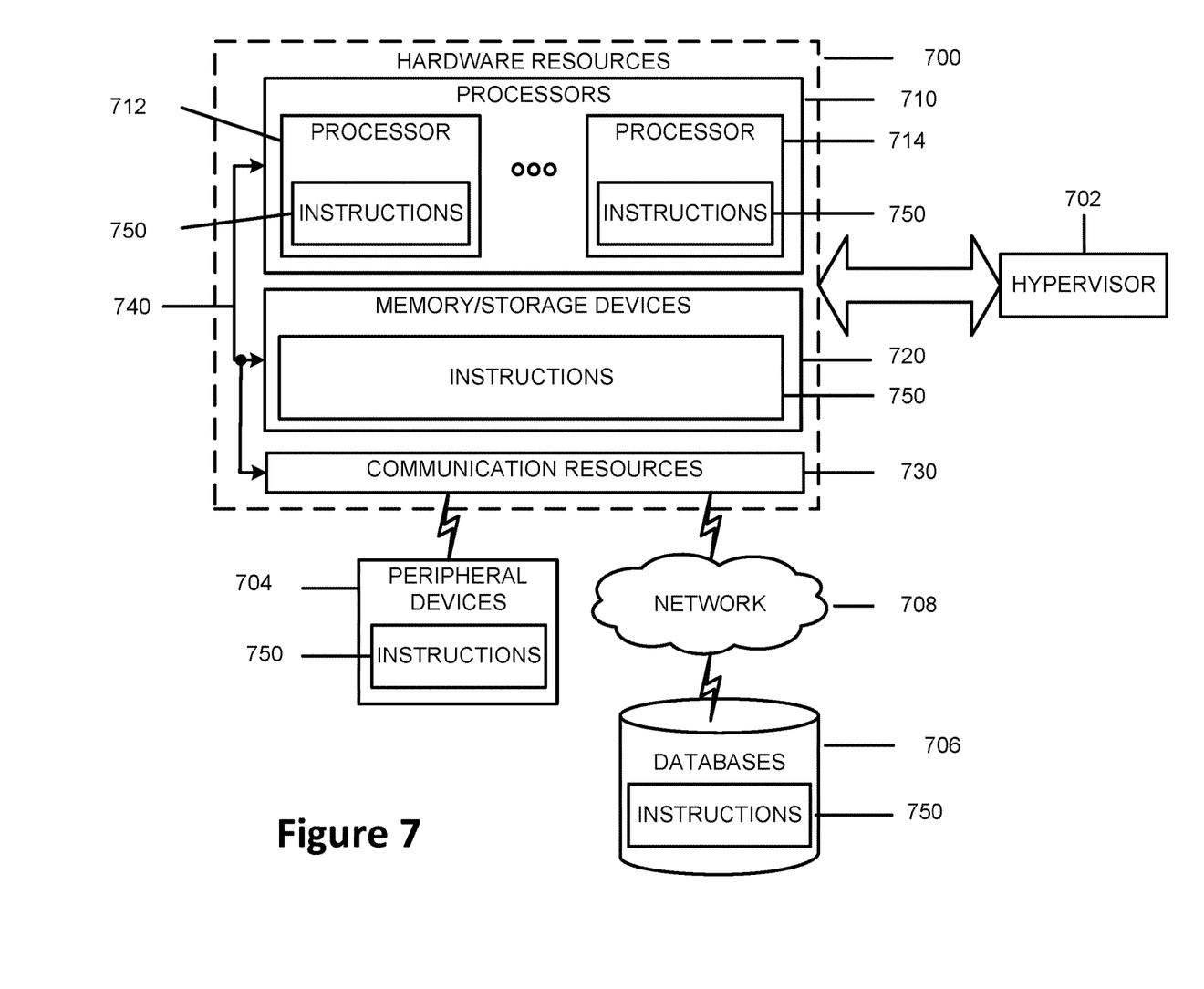
FIG. 7 illustrates hardware resources in accordance with various embodiments.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 may include, for example, a processor 712 and a processor 714. The processor(s) 710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 720 may include main memory, disk storage, or any suitable combination thereof. The memory/storage devices 720 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via USB), cellular communication components, NFC components, Bluetooth® (or Bluetooth® Low Energy) components, Wi-Fi® components, and other communication components.

Instructions 750 may comprise software, a program, an application, an applet, an app, or other executable code for causing at least any of the processors 710 to perform any one or more of the methodologies of mapping PT-RS onto resource elements discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method of operating a UE, the method comprising: determining determine whether a resource element (RE) is to be used for a non-zero power (NZP) channel state information-reference signal (CSI-RS); if determined that the RE is not to be used for the NZP CSI-RS, determining the RE can be used for a phase tracking-reference signal (PT-RS) and decode the RE to obtain the PT-RS; and if determined that the RE is to be used for the NZP CSI-RS, determining a type of the NZP CSI-RS and determining whether the RE can be used for the PT-RS based on the type of the NZP CSI-RS.

Example 2 may include the method of example 1 or some other example herein, further comprising: determining that the RE is to be used for the NZP CSI-RS; determining the type is a mobility type or an aperiodic type; and determining that the RE can be used for the PT-RS and decode the RE to obtain the PT-RS.

Example 3 may include the method of example 1 or some other example herein, further comprising: determining that the RE is to be used for the NZP CSI-RS; determining the type is not a mobility type or an aperiodic type; and determining that the RE cannot be used for the PT-RS and decode the RE to obtain the NZP CSI-RS.

Example 4 may include the method of example 1 or some other example herein, further comprising: determining that the RE is to be used for the NZP CSI-RS; determining the type is a radio resource control (RRC) configured type; and determining that the RE cannot be used for the PT-RS and decode the RE to obtain the NZP CSI-RS.

Example 5 may include the method of example 1 or some other example herein, further comprising: determining that the RE is to be used for the NZP CSI-RS; determining the type is a physical downlink control channel (PDCCH)-configured type; and determining that the RE can be used for the PT-RS and decode the RE to obtain the PT-RS.

Example 6 may include the method of example 5 or some other example herein, further comprising: determining, based on configuration information received from an access node, that a plurality of REs, including the RE, are to carry a PT-RS.

Example 7 may include a method of operating a UE, the method comprising: determining whether a resource element (RE) is to be used for a cell-specific reference signal (CRS) configured by the configuration information; if determined that the RE is to be used for the CRS, determining that the RE cannot be used for a phase-tracking reference signal (PT-RS); and if determined that the RE is not to be used for the CRS configured by the configuration information, determining that the RE can be used for the PT-RS and decode the RE to obtain the PT-RS.

Example 8 may include the method of example 7 or some other example herein, further comprising receiving higher-layer signaling that includes the configuration information.

Example 9 may include the method of example 8 or some other example herein, wherein the higher-layer signaling comprises radio resource control (RRC) signaling.

Example 10 may include the method of any one of examples 7-9, wherein the configuration information is to schedule a plurality of REs, including the RE, to carry the PT-RS.

Example 11 may include a method of operating a UE, the method comprising: receiving configuration information from an access node, the configuration information to configure a control resource set (CORSET) 0 and a phase-tracking-reference signal (PT-RS); determining a set of resource elements (REs) that are to be used for the PT-RS based on configuration of the CORESET 0; and decoding the set of REs to be used for the PT-RS to obtain the PT-RS.

Example 12 may include the method of example 11 or some other example herein, wherein determining the set of REs comprises: determining that the CORESET 0 is not indicated in a rate match pattern element of the configuration information; and determining the set of REs without taking into account the CORESET 0 based on determination that the CORESET 0 is not indicated in the rate match pattern element.

Example 13 may include the method of example 11 or some other example herein, wherein determining the set of REs comprises determining REs or resource blocks configured for the CORESET 0 are not available for the PT-RS.

Example 14 may include the method of example 11 or some other example herein, wherein determining the set of REs comprises: determining that the CORESET 0 is tied to a synchronization signal block (SSB) having an index; and determining REs or resource blocks configured for the CORESET 0 are not available for the PT-RS based on said determination that the CORESET 0 is tied to the SSB with the index.

Example 15 may include the method of example 14 or some other example herein, wherein the index is: identified during a most recent random access; explicitly indicated by a media access control (MAC) control element; or implicitly indicated based on a transmission configuration indication (TCI) state that includes a CSI-RS quasi-co-located with the SSB.

Example 16 may include the method of example 15 or some other example herein, wherein determining the set of REs comprises: determining that the CORESET 0 is indicated in a rate match pattern element; and determining the REs or resource blocks configured for the CORESET 0 are not available for the PT-RS based further on said determination that the CORESET 0 is indicated in the rate match pattern element.

Example 17 may include the method of example 15 or some other example herein, further comprising determining the REs or resource blocks configured for the CORESET 0 are not available for the PT-RS regardless of whether the CORESET 0 is indicated in a rate match pattern element.

Example 18 may include the method of any one of examples 11-17, wherein the configuration information is received via a plurality of configuration signals.

Example 19 may include a method of operating an access node, the method comprising: generating one or more configuration signals to send the configuration information to a user equipment to configure a control resource set (CORSET) 0 and a phase-tracking-reference signal (PT-RS); determining a set of resource elements (REs) that are to be used for the PT-RS based on configuration of the CORESET 0; and encoding the set of REs with the PT-RS.

Example 20 may include the method of example 19 or some other example herein, wherein determining the set of REs comprises: determining that the CORESET 0 is not indicated in a rate match pattern element of the configuration information; and determining the set of REs without taking into account the CORESET 0 based on determination that the CORESET 0 is not indicated in the rate match pattern element.

Example 21 may include one or more non-transitory computer-readable media comprising instructions to cause an electronic device, upon execution of the instructions by one or more processors of the electronic device, to perform one or more elements of a method or CRM described in or related to any of examples 1-20, or any other method or process described herein.

Example 22 may include an apparatus comprising logic, modules, and/or circuitry to perform one or more elements of a method or CRM described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer-readable media comprising instructions that, when executed by the one or more processors, cause the one or more processors to perform the method, techniques, or process as described in or related to any of examples 1-20, or portions thereof, or otherwise described in the present disclosure. The one or more computer-readable media may be one transitory or non-transitory computer-readable media.

Example 25 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-20, or portions thereof, or otherwise described in the present disclosure.

Example 26 includes a signal as described in or related to any of examples 1-20, or portions or parts thereof, or otherwise described in the present disclosure.

Example 27 includes a signal in a wireless network as shown and described in the present disclosure, or otherwise described in the present disclosure.

Example 28 includes a method of communicating in a wireless network as shown and described in the present disclosure.

Example 29 includes a system for providing wireless communication as shown and described in the present disclosure.

Example 30 includes a device for providing wireless communication as shown and described in the present disclosure.

Example 31 includes a packet, frame, segment, protocol data unit (PDU), or message as described in or related to any of examples 1-20, or portions or parts thereof, or otherwise described in the present disclosure.

What is claimed is:

1. One or more non-transitory computer-readable media (CRM) comprising instructions that, when executed by one or more processors of a user equipment (UE), cause the UE to:
   determine whether a resource element (RE) is to be used for a non-zero power (NZP) channel state information-reference signal (CSI-RS);
   in response to determining that the RE is not to be used for the NZP CSI-RS:
      determine that the RE can be used for a phase tracking-reference signal (PT-RS); and
      decode the RE to obtain the PT-RS; and
   in response to determining that the RE is to be used for the NZP CSI-RS:
      determine whether a type of the NZP CSI-RS is a mobility type;
      determine that the RE can be used for the PT-RS based on the type of the NZP CSI-RS being the mobility type; and
      decode the RE to obtain the PT-RS based on the type of the NZP CSI-RS being the mobility type.

2. The one or more non-transitory CRM of claim 1, wherein the instructions, when executed by the one or more processors, further cause the UE to:
   determine that the RE is to be used for the NZP CSI-RS;
   determine that the type an aperiodic type;
   determine that the RE can be used for the PT-RS; and
   decode the RE to obtain the PT-RS in response to determining that RE can be used for the PT-RS based on the type being the aperiodic type.

3. The one or more non-transitory CRM of claim 1, wherein the instructions, when executed by the one or more processors, further cause the UE to:
   determine that the RE is to be used for the NZP CSI-RS;
   determine that the type is not the mobility type or an aperiodic type;
   determine that the RE cannot be used for the PT-RS; and
   decode the RE to obtain the NZP CSI-RS in response to the determining that the RE can not be used for the PT-RS.

4. The one or more non-transitory CRM of claim 1, wherein the instructions, when executed by the one or more processors, further cause the UE to:
   determine that the RE is to be used for the NZP CSI-RS;
   determine that the type is a radio resource control (RRC) configured type;
   determine that the RE cannot be used for the PT-RS; and
   decode the RE to obtain the NZP CSI-RS.

5. The one or more non-transitory CRM of claim 1, wherein the instructions, when executed by the one or more processors, further cause the UE to:
   determine that the RE is to be used for the NZP CSI-RS;
   determine that the type is a physical downlink control channel (PDCCH)-configured type;
   determine that the RE can be used for the PT-RS; and
   decode the RE to obtain the PT-RS.

6. The one or more non-transitory CRM of claim 5, wherein the instructions, when executed by the one or more processors, further cause the UE to:
   determine, based on configuration information received from an access node, that a plurality of REs that include the RE are to carry a PT-RS.

7. An apparatus comprising:
   interface circuitry configured to receive configuration information from an access node; and processing circuitry coupled to the interface circuitry, configured to:
  determine whether a resource element (RE) is to be used for a cell-specific reference signal (CRS) configured by the configuration information based on whether the RE is configured by higher-layer signaling or lower-layer signaling;
  in response to determining that the RE is to be used for the CRS, determine that the RE cannot be used for a phase-tracking reference signal (PT-RS); and
  in response to determining that the RE is not to be used for the CRS configured by the configuration information:
    determine that the RE can be used for the PT-RS; and
    decode the RE to obtain the PT-RS.

8. The apparatus of claim 7, wherein the interface circuitry is configured to receive higher-layer signaling that includes the configuration information.

9. The apparatus of claim 8, wherein the higher-layer signaling comprises radio resource control (RRC) signaling.

10. The apparatus of any one of claim 7, wherein the configuration information is configured to schedule a plurality of REs that include the RE to carry the PT-RS.

11. The apparatus of claim 7, wherein the configuration information is received using Radio Resource Control (RRC) signaling.

12. The apparatus of claim 7, wherein the processing circuitry is further configured to:
  determine that the RE is configured for CRS only by lower-layer signaling; and
  determine that the RE can be used for PT-RS based on the determining that the RE is configured for CRS only by lower-layer signaling.

13. One or more non-transitory computer-readable media (CRM) having instructions that, when executed, cause a user equipment (UE) to:
  receive configuration information from an access node, the configuration information configuring a control resource set (CORSET) 0 and a phase-tracking-reference signal (PT-RS);
  determine a set of resource elements (REs) that are to be used for the PT-RS based on configuration of the CORESET 0; and
  decode the set of REs to be used for the PT-RS to obtain the PT-RS,
  wherein the determining the set of REs includes determining that REs or resource blocks configured for the CORESET 0 are not available for the PT-RS.

14. The one or more non-transitory CRM of claim 13, wherein to determine the set of REs, the UE is configured to:
  determine that the CORESET 0 is not indicated in a rate match pattern element of the configuration information; and
  determine the set of REs without taking into account the CORESET 0 based on the determination that the CORESET 0 is not indicated in the rate match pattern element.

15. The one or more non-transitory CRM of claim 13, wherein to determine the set of REs, the UE is configured to:
  determine that the CORESET 0 is tied to a synchronization signal block (SSB) having an index; and
  determine that REs or resource blocks configured for the CORESET 0 are not available for the PT-RS based on said determination that the CORESET 0 is tied to the SSB with the index.

16. The one or more non-transitory CRM of claim 15, wherein the index is one of: (1) identified during a most recent random access, (2) explicitly indicated by a media access control (MAC) control element, or (3) implicitly indicated based on a transmission configuration indication (TCI) state that includes a CSI-RS quasi-co-located with the SSB.

17. The one or more non-transitory CRM of claim 15, wherein to determine the set of REs, the UE is configured to:
  determine that the CORESET 0 is indicated in a rate match pattern element; and
  determine that the REs or resource blocks configured for the CORESET 0 are not available for the PT-RS based on said determination that the CORESET 0 is indicated in the rate match pattern element.

18. The one or more non-transitory CRM of claim 16, wherein the UE is further configured to determine that the REs or resource blocks configured for the CORESET 0 are not available for the PT-RS regardless of whether the CORESET 0 is indicated in a rate match pattern element.

19. The one or more non-transitory CRM of claim 13, wherein the configuration information is received via a plurality of configuration signals.

20. The one or more non-transitory CRM of claim 13, wherein the configuration information is received via Radio Resource Control (RRC) signaling.

* * * * *

UNITED STATES PATENT AND TRADEMARK OFFICE
CERTIFICATE OF CORRECTION

PATENT NO. : 12,177,151 B2  
APPLICATION NO. : 17/286341  
DATED : December 24, 2024  
INVENTOR(S) : Wang et al.

Page 1 of 1

It is certified that error appears in the above-identified patent and that said Letters Patent is hereby corrected as shown below:

In the Claims

In Column 18, Claim 2, Line 28, after "type" insert -- is --.

In Column 19, Claim 10, Line 22, delete "of any one of claim" and insert -- of claim --, therefor.

Signed and Sealed this  
Fourth Day of February, 2025

Coke Morgan Stewart  
*Acting Director of the United States Patent and Trademark Office*